United States Patent [19]

Spence-Bate

[11] 4,026,652

[45] May 31, 1977

[54] FILM CARRIAGE MECHANISM AND METHOD OF MOVING A FILM LAMINA

[76] Inventor: Harry Arthur Hele Spence-Bate, 115 Cheam Plate, Morley, Australia, 6062

[22] Filed: May 13, 1975

[21] Appl. No.: 576,986

[30] Foreign Application Priority Data

May 17, 1974 Australia .......................... 7601/74

[52] U.S. Cl. .................................. 355/54; 355/73
[51] Int. Cl.² ........................................ G03B 27/52
[58] Field of Search ....................... 355/73, 53, 54; 248/362, 363

[56] References Cited

UNITED STATES PATENTS

| | | | |
|---|---|---|---|
| 3,746,444 | 7/1973 | Kahle et al. ....................... | 355/54 X |
| 3,767,302 | 10/1972 | Roberts et al. ..................... | 355/53 |
| 3,782,819 | 1/1974 | Kanayama et al. .................. | 355/54 |
| 3,837,742 | 9/1974 | Wally, Jr. .......................... | 355/53 X |
| 3,870,413 | 3/1975 | Goebel .............................. | 355/53 |
| 3,903,532 | 9/1975 | Harrison ........................... | 355/53 X |

Primary Examiner—Richard A. Wintercorn
Attorney, Agent, or Firm—Fidelman, Wolffe & Waldron

[57] ABSTRACT

A film carriage mechanism and method of moving a film lamina such as a microfiche film lamina. In the mechanism preferably mounted in a microfiche camera a film carrier is mounted for movement in an 'X' direction and a 'Y' direction in relation to one or more stations which include a filming station and preferably a titling station and a film release station. The carrier has a first platen for holding preferably by suction means a first lamina and a second platen for holding by a similar means a second or follow-up lamina, each platen is provided with additional 'X' and 'Y' movement within the carrier and suitable suction and movement programming is provided to move the lamina from an initial pick up station to the filming station. At the filming station a particular time saving pattern of movement is suitably provided. After completion of the filming stage the first lamina is moved as required to a fitting stage and thence to the release station while the follow-up lamina is being moved to the filming station.

In a first embodiment the platens are arranged to move independently or in unison and can act to move one lamina when together or two laminae when moving independently on an inner carriage frame.

In a second embodiment two X direction frame activators are used in order to eliminate the inner carriage.

21 Claims, 4 Drawing Figures

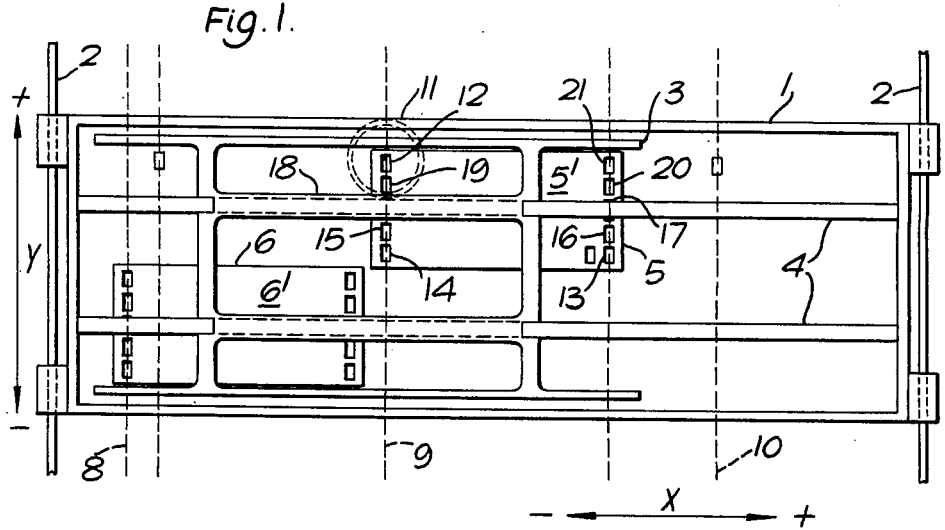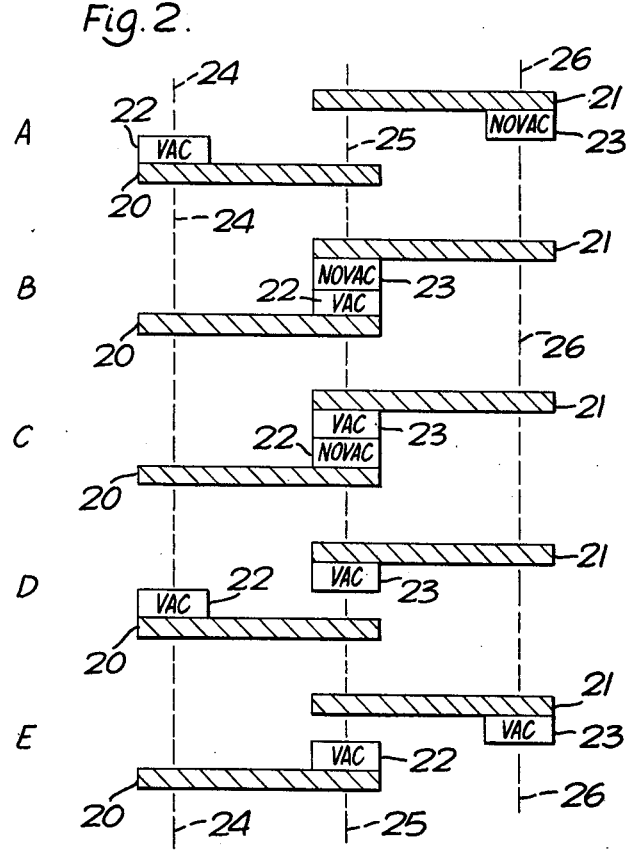

FILM CARRIAGE MECHANISM AND METHOD OF MOVING A FILM LAMINA

The present invention relates to the carriage and movement of a film lamina with relation to one or more stations in a direction parallel with a row of images on the film (hereinafter referred to as the X direction) and in a direction from row to row (hereinafter referred to as the Y direction).

In a microfiche camera where an uninterrupted flow of recordings on a film has to be made, it is necessary to move each microfiche film at high speeds. Conventional microfiche cameras tend to impose significant delays in moving the film along the direction of a row of images (X direction) and from row to row (Y direction).

It is therefore an object of the invention to provide mechanism which improves the speed at which films can be handled in a microfiche camera.

The present invention consists in a film carriage mechanism including a film carrier mounted for movement in an X direction and a Y direction in relation to one or more stations, the carrier including means for causing the X and Y direction movement, first platen means for holding a film lamina, second platen means for holding a film lamina, a main frame in which the first and second platen means are mounted for the X direction movement, the frame being mounted for the Y direction movement, wherein each platen means is provided with means for picking up, holding and releasing a film lamina.

Advantageously the means for picking up, holding and releasing a film lamina is a suction device.

Each platen means may be moved in the X direction by a helically grooved drum.

The film carrier is preferably mounted in a microfiche camera in which said stations include a film pick-up station, a plurality of filming stations, a titling station and a film release station.

The invention will now be described with reference to the accompanying drawings of embodiments of the invention in which:

FIG. 1 shows a plan view of a film carrier of part of the film carriage mechanism according to a first embodiment of the invention.

FIG. 2 is a diagram of a second embodiment of the invention showing a two X direction helix arrangement.

Figure 3:
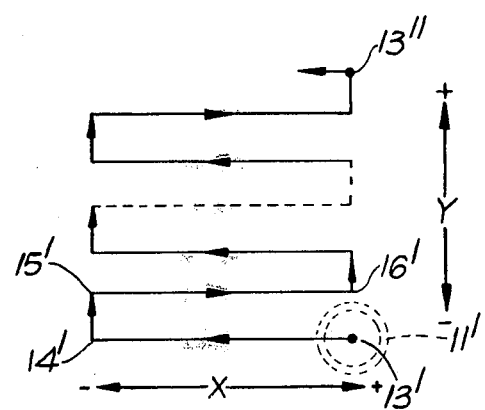
FIG. 3 is a diagram of relative film movement used in the first embodiment shown in FIG. 1.

In FIG. 1 there may be seen generally the film carrier which is formed from a main frame 1 mounted on guides 2 for Y direction movement and an inner frame 3 mounted on guides 4 for X direction movement. The main frame 1 and inner frame 3 are driven by positioning mechanisms referred to hereafter as X and Y activators. These activators may have helically grooved rollers or drums to ensure accurate location of the frames. The activators may also have other arrangements for location of the frames in a programmed location.

The inner frame 3 in turn carries a first platen 5 for holding a film lamina 5' and a second platen 6 for holding a second film lamina 6a. Each platen is also known as a split platen. Each platen can be locked to or released from the inner frame for independant X direction movment. Each platen is provided with a vacuum suction arrangement for picking up, holding and dropping the laminae.

The platens are arranged to move between three stations represented by the lines 8, 9 and 10, 8 and 9 representing the pick-up, filming and titling stations. the titling station 10 is also the release station. The double broken circle 11 represents the camera lens mount.

Platen 5 is shown in a position for the last image 12 of the top row to be taken whilst platen 6 has just engaged with a follow-up or new film lamina. At this stage both vacuum platens are locked to the inner frame 3.

At the pick-up station 8 there is provided a removable cassette (not shown) for holding new film laminae. After the last image 12 on lamina 5' has been taken, the main frame shifts in a Y + direction which detaches new film lamina 6' from its cassette which lamina is then retained solely on platen 6. Inner frame 3 then moves in a X + direction bringing the new lamina 6' into the filming station 9. The same movement of the inner frame 3 brings lamina 5' to titling station 10 where microfiche titling takes place. After titling the lamina 5' is released for developing.

During filming the images it is arranged the X and Y movement of the frames is at a minimum so that time lost in travel from one image position to another is at a minimum. In the case of lamina 5' the first image to be filmed is 13. The platen is then moved image by image to 14 then to 15 to 16, 17 (nearly obscured) then to an image obscured by frame past 18, 19, 20, 21 and finally 12, a total of 60 images being filmed in this stand.

The X and Y movement of the film relative to the filming station in the first embodiment is shown in more detail in FIG. 3. The first image is filmed at 13' and subsequent images are filmed towards 14', up to 15', back to 16' and so on upwards and to and fro until the film carrier has completed to movements required to record all the images on the first film lamina.

The second film lamina is then moved into the filming station and the carrier has located the first frame of the second lamina ready to record the first image in position 13" which due to the movement of the first lamina is in fact back in the filming station of the camera lens 11'.

It will be understood that the bottom right location 13' of the first image is equivalent to a top left frame on the developed film. It will also be realised that the minimum carriage movement is required in the described filming motion (i.e. no long returns to the next line have to be made) and this increases filming speeds. Also the follow-up laminae are arranged to be in the correct position for recording their first images, only a single movement being required from the previous to the follow-up lamina.

In order to control the various movement of the platens these can be locked and unlocked to the inner or main frame. In this way movement of the inner frame in an X direction may not cause movement to a platen unlocked from the inner frame but locked to the main frame. Thus the platens can be made to move independantly or in unison.

In a second embodiment shown diagrammatically in FIG. 2 the control of the two platens in the X direction is even further independantly controlled. Thus an inner frame is not used but two X direction activators are used instead of one. These activators are helically grooved drums 20 and 21 which control X direction movement of platens 22 and 23 respectively.

It will be seen in FIG. 2 that at A a first lamina is picked up at pick-up station 24 by platen 22 whilst platen 23 has no lamina.

At B the first lamina is moved on platen 22 in an X+ direction to filming station 25 and platen 23 is moved with no vacuum on the meet platen 22.

At this stage logic circuit of the mechanism ask if a next lamina is to be required and pretitling arrangements are made.

At C platen 25 has vacuum seal and holds the first lamina whilst platen 22 has no vacuum and releases the first lamina. Filming can continue or the first lamina can be moved to the titling station 26.

At D platen 23 can be seen finishing filming whilst platen 22 has just picked up a new (second) lamina.

At E platen 23 has moved the first lamina to the titling station 26 whilst the second lamina has been moved to the filming station 25.

The suction platens not shown in detail are arranged so that the platen suction surface has a number of holes arranged in groups or rows aligned in the Y direction. These rows are connected to several chambers so that when a lamina is to be picked up a centre row is first given suction. Thereafter successive outward rows are connected from the centre of the platen outwards in a X+ and Y − direction. In this way the lamina is sucked out of its cassette from its centre until finally the cassette releases its outer edges.

Figure 4:
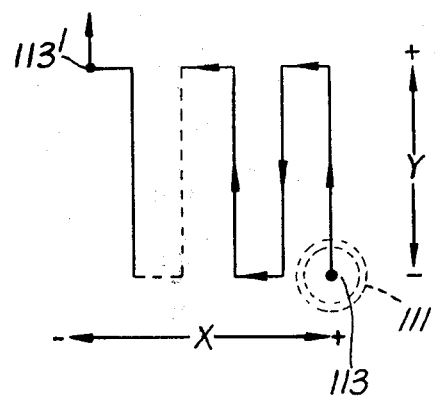
FIG. 4 is a diagram of relative film movement used in a further embodiment of the invention.

In certain cameras it is desirable to arrange that the laminae are presented to the camera in an alignment 90° to the alignment shown in FIG. 1. In these cameras it is convenient to arrange for the film movement to be as shown in FIG. 4. In this arrangement the first image of the first is recorded in position 113 (the lens being shown diagrammatically by broken double circle 111). Subsequent images are then taken in a Y axis direction and so on so that the first image of the follow-up lamina is taken at position 113' which due to carriage movement is effectively back at filming station 111.

Having described my invention, I claim:

1. A film carriage mechanism for moving a film in a camera in an 'X' direction relative to one or more stations, said mechanism including a first frame mounted for movement in one of the said XY directions and a second frame mounted on the first frame for movement in the other of the said XY directions, first platen means including means for holding a film lamina and second platen means adapted for picking up, holding and releasing a film lamina, both platen means being mounted for movement in said other of the said XY directions, and both platen means being mounted on guide means so that at opposite ends of their movement in said other of said XY directions they are aligned at an alignment position on said one of said XY directions, whereby the film lamina may be transferred from one said platen to the other said platen at the alignment position.

2. The film carriage mechanism of claim 1 wherein said second platen means includes suction means adapted for picking up, holding and releasing the firm lamina.

3. The film carriage mechanism of claim 1 wherein means are provided to hold the first platen means at a pick-up station and a filming station, means are provided to hold the second platen means at a filming station and a titling station.

4. The mechanism of claim 3 wherein means are provided to transfer the film lamina from the first platen means to the second platen means at the filming station.

5. The mechansim of claim 4 wherein means are provided to release the film at the titling station.

6. The mechanism of claim 1 wherein the platens are contiguous at the said alignment position.

7. A film carriage mechanism for moving a film in a camera in an X and Y direction relative to one or more stations, said mechanism including a frame mounted for movement in one of the said XY direction, first platen means including means for holding a film lamina and second platen means including means for holding a film lamina, both platen means being mounted on the said frame for movement in said other of the said XY directions, activator means connected to the platen for moving the platens in said other of said XY directions, wherein both platen means are mounted on guide means so that at opposite ends of their movement in said other of said XY directions they are aligned in said one of said XY directions, whereby the film lamina may be transferred from one said platen to the other said platen at the alignment position.

8. The mechanism of claim 7 wherein said means for holding a film lamina comprising a suction platen.

9. The mechanism of claim 7 wherein means are provided to hold the first platen means at a pick-up station and a filming station, means are provided to hold the second platen means at a filming station and a titling station.

10. The mechanism of claim 9 wherein means are provided to transfer the film lamina from the first platen means to the second platen means at the filming station.

11. The mechanism of claim 10 wherein means are provided to release the film at the titling station.

12. The mechanism of claim 7 wherein the platens are contiguous at the said alignment position.

13. The mechanism of claim 7 wherein said activator means comprises a first and second helically grooved drum which are adapted to control X direction movement of said first and second platens respectively.

14. A microfiche camera including a filming means having a lens and lens mount provided at a filming station, a film carriage mechanism mounted in the camera for having a film in the camera in an X and Y direction relative to the filming station, said mechanism including a first frame mounted for movement in one the said XY directions and a second frame mounted on the first frame for movement in the other of the said XY directions, first and second activator means connected to the frames and arranged to cause the said two movements respectively, first platen means including means for holding a film lamina and second platen means adapted for picking up, holding and releasing a film lamina, both platen means being mounted for movement in said other of the said XY directions, and both platen means being mounted on guide means so that at opposite ends of their movement in said other of said XY directions they are aligned at an alignment position of said one of said XY direction, whereby the film lamina may be transferred from one said platen to the other said platen at the alignment position.

15. A microfiche camera including a filming means having a lens and lens mount provided at a filming station, a film carriage mechanism mounted in the camera for moving a film in the camera in an X and Y direction relative to the filming station, said mechanism including a frame mounted for movement in one of the said XY directions, first activator means connected to the frame and arranged to cause said movement in said one of the XY directions, first platen means including means for holding a film lamina and second platen means including means for holding a film lamina, both platen means being mounted on the said frame for movement in said other of the said XY directions, second activator means connected to the platen for moving the platens in said other of said XY directions, wherein both platen means are mounted on guide means so that at opposite ends of their movement in said other of said XY directions they are aligned in said one of said XY direction, whereby the film lamina may be transferred from one said platen to the other said platen at the alignment position.

16. A method of moving a microfiche lamina on a platen in a microfilm camera for recording images on said lamina in an X and Y direction relative to a filming station comprising moving the lamina in first XY direction from a first images recording position to a second image position thence in a YX direction at 90° to said XY direction to a next image recording position thence in a reverse XY direction, and thence in said YX direction until a final image recording position is reached whence by a further said YX direction movement the platen is in a position for the first image recording position of a follow-up lamina in the same relative position as the first image recording position.

17. The method of claim 16 further comprising moving the lamina from a pick-up station to the filming station, thence, on completion of recording said image, moving the lamina to a titling station.

18. The method of claim 17 further comprising releasing the lamina at said titling station and developing the lamina.

19. The method of claim 16 comprising picking up the lamina from lamina storage means at a pick-up station moving the lamina by means of a first platen means to the filming station, transferring the lamina at the filming station to a second platen means, returning said first platen means to the pick-up station, completing the recording of images at the filming station and moving the lamina on the second platen means to a titling station whilst moving the first platen means to the filming station with the possibility of conveying a follow-up lamina on the first platen means to the filming station in the event of availability of the follow-up lamina.

20. The method of claim 19 comprising providing a first frame movable in a Y direction, a second frame mounted on the first frame and movable in an X direction, a first and second platen means further movable in said second frame in a X direction wherein the first and second platen means are locked for movement to the second frame whilst moving the first and second platen means simultaneously from the pick-up station to the filming station and from the filming station to the tilting station respectively whereby movement of said second frame causes the combined Y direction movement.

21. The method of claim 19 comprising providing a frame movable in a Y direction, a first and second platen means mounted in said frame for X direction movement, and moving a lamina on said platen means by separate activator means from the pick-up station to a filming station and thence to a titling station.

* * * * *